United States Patent [19]

Hays

[11] Patent Number: 4,643,770

[45] Date of Patent: Feb. 17, 1987

[54] AMINE-FREE, EASILY DISPERSIBLE DIARYLIDE YELLOW PIGMENT COMPOSITIONS

[75] Inventor: Byron G. Hays, Verona, N.J.

[73] Assignee: BASF Corporation, Inmont Division, Clifton, N.J.

[21] Appl. No.: 722,970

[22] Filed: Apr. 12, 1985

[51] Int. Cl.$^4$ .............................................. C09D 11/02
[52] U.S. Cl. .................................. 106/23; 106/288 Q; 106/308 Q; 106/309
[58] Field of Search ............... 106/23, 288 Q, 308 Q, 106/309; 534/561, 581, 582, 583

[56] References Cited

U.S. PATENT DOCUMENTS 3,991,044 11/1976 Conley ............................ 106/308 Q

OTHER PUBLICATIONS

Derwent Abstract Accession No. 85-056968/10, German Pat. No. DE 3329846, Feb. 28, 1985.

Primary Examiner—Amelia B. Yarbrough
Attorney, Agent, or Firm—Emil R. Skula

[57] ABSTRACT

Diarylide yellow pigment compositions comprising the reaction product of tetrazotized 3,3'-dichlorobenzidine coupled into an acetoacetarylide, and, a ketimine formed by the reaction of a primary amine and an acetoacetarylide. The ketimine-containing diarylide yellow pigment compositions have improved color strength, improved transparency and contain essentially no free primary amine. Printing inks manufactured with the diarylide yellow pigment compositions of this invention have increased color strength, increased transparency, decreased degradation of publication gravure ink vehicles and decreased acidic fountain solution emulsification in offset ink printing processes.

10 Claims, No Drawings

AMINE-FREE, EASILY DISPERSIBLE DIARYLIDE YELLOW PIGMENT COMPOSITIONS

TECHNICAL FIELD

The field of art to which this invention pertains is organic pigments, specifically diarylide yellow pigment compositions.

BACKGROUND ART

Diarylide yellow pigments are well known in the art. These pigments are particularly useful as the coloring components of various types of printing inks. Diarylide yellow pigments are organic compounds possessing a disazo structure, wherein both of the azo linkages are couplings with acetoacetarylides. The diarylide yellow pigments are typically manufactured by tetrazotizing 3,3'-dichlorobenzidene and forming the tetrazonium salt, 3,3'-dichlorobenzidine tetrazonium chloride. The tetrazonium salt is then coupled with an acetoacetarylide such as aceto acetanilide to form the coupling product.

Diarylide yellow pigments are classified according to the acetoacetarylide to which the tetrazonium salt of 3,3'-dichlorobenzidine is coupled. AAA diarylide yellow is the product of 3,3'-dichlorobenzidine coupled into acetoacetanilide (AAA). AAMX diarylide yellow is the product of 3,3'-dichlorobenzidine coupled into acetoacet-2,4-xylidide (AAMX). AAOA diarylide yellow is the product of 3,3'-dichlorobenzidine coupled into acetoacet-o-anisidide (AAOA). AAOT diarylide yellow is the product of 3,3'-dichlorobenzidine coupled into acetoacet-o-toluidide (AAOT). HR yellow is the product of 3,3'-dichlorobenzidine coupled into acetoacet-2,5-dimethoxy-4-chloranilide. Various types of diarylide yellow pigments can be manufactured depending upon the acetoacetarylide coupling agent or agents used, and, the compounds will have varying color and pigment characteristics.

Use of a different type of coupling agent, a pyrazolone derivative, gives redder pigments: 3,3'-dichlorobenzidine coupled into 3-methyl-1-phenyl-2pyrazolin-5-one (PMP) gives PMP diarylide orange.

Redder diarylide pigments are made also by using another benzidine derivative, 3,3'-dimethoxybenzidine: when this is tetrazotized and coupled into AAA, dianisidine orange results; when coupled into PMP, dianisidine red results.

Diarylide yellow pigment compositions are the primary organic yellow pigment compositions produced in the United States. Of the diarylide yellow pigment compositions, AAA diarylide yellow is the most widely used.

As previously mentioned, one of the primary applications for diarylide yellows is as a coloring agent in printing inks. The diarylide yellow pigments can be used in oil based, water based, or solvent based ink compositions. Depending on the ink composition, these pigments are either left as is or treated with resins, surfactants, etc., a more complete description is contained in "Surface Treatment of Organic Pigments for Printing Ink Applications", by B. G. Hays, in "American Ink Maker," Vol. 62, No. 6 (June, 1984), pp 28–50, which is incorporated by reference. These treatments usually improve various printing ink and printing process properties.

In order to use or incorporate diarylide yellow pigments in publication gravure printing inks, it is typically necessary to pretreat the pigments so that they become easily dispersible as described in "Criteria for Pigment Selection for Publication Gravure Inks," by B. G. Hays, in "Gravure Technical Association Bulletin," Vol. 34, No. 4 (Winter, 1983), pp32–39), which is incorporated by reference. Typically, the diarylide yellow pigment is made easily dispersible by treating the pigment with a fatty alkyl primary amine. This is typically done by adding an acidic solution of the fatty alkyl primary amine to a diarylide yellow pigment, raising the pH to precipitate the amine, filtering, washing, drying the presscake and forming the ketimine between the amine and aceto groups on the surface of the acetoacetarylide pigment after the pigment reaches less than about 1% water content. The time and temperature required for this ketimine reaction necessitate using fatty alkyl amines with low volatility. A typical ketimine reaction is as follows:

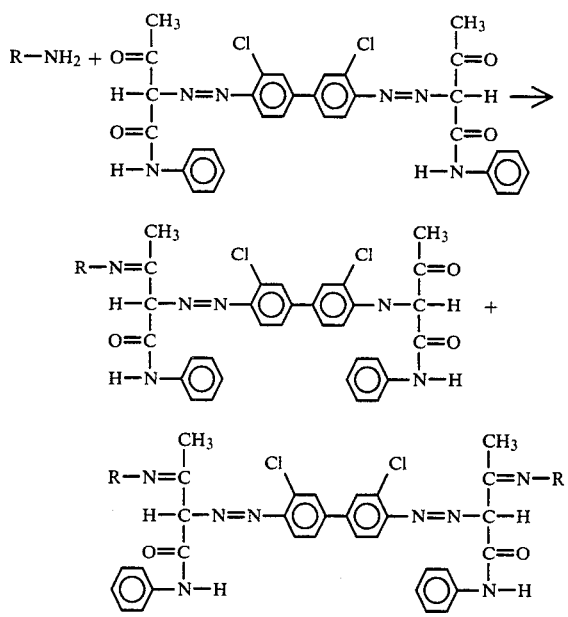

The resulting treated pigments, although easily dispersible, are coated with a substantial amount of residual, unreacted amine. This unreacted amine is removed with considerable difficulty by drying at elevated temperatures and presents several disadvantages. Firstly, the unreacted amine can react with publication gravure ink limed rosin vehicles, resulting in inks that penetrate into and hold out poorly on uncoated papers and give weak prints. Secondly, if the pigment is incorporated into an oil-based offset ink, the unreacted amine can emulsify excessive amounts of acidic fountain solution into the ink, thereby producing a variety of printing problems such as tinting and scumming.

It is also known in the art that many diarylide yellow pigment compositions, while having desirable color strength, degrade in the presence of heat, elevated temperatures or light or may be too costly (e.g., HR Yellow). The choice of a particular diarylide yellow pigment is dictated by the requirements of the particular application, e.g., light fastness, heat resistance and economics.

There is a constant search in this art for diarylide yellow pigment compositions having improved properties such as improved color strength, improved transparency and improved resistance to degradation. It is known in the art that the fatty alkyl amine treatment of diarylide yellow pigment, with the resulting residual free amine, results in degradation of the printing ink vehicle. It is also known that the excess unreacted amine results in excessive emulsification of fountain solution in oil-based offset printing inks. It is also known that heat treatment to remove the free amine can adversely affect the pigment characteristics.

Accordingly, what is needed in this art are easily dispersible diarylide yellow pigment compositions, having the advantages of the amine-ketimine treatment, but containing no residual unreacted amine and a method of producing such compositions.

DISCLOSURE OF INVENTION

A diarylide yellow pigment composition is disclosed. The pigment composition comprises:
(a) the tetrazonium salt of 3,3'-dichlorobenzidine coupled with an acetoacetarylide to form a coupling product;
(b) the tetrazonium salt of 3,3'-dichlorobenzidine coupled with a ketimine to form a coupling product; and,
(c) the tetrazonium salt of 3,3'-dichlorobenzidine coupled with a ketimine and an acetoacetarylide to form a coupling product,
wherein the ketimine is the reaction product of a primary amine and an acetoacetarylide, the ketimine is coupled with tetrazonium salt prior to the coupling of the acetoacetarylide with the tetrazonium salt, during said coupling, or after said coupling, thereby producing diarylide yellow pigment compositions having easy dispersibility, improved color strength and essentially no free primary amine.

Another aspect of this invention is a method of manufacturing a diarylide yellow pigment composition containing ketimines to improve dispersibility.

A method of manufacturing a diarylide yellow pigment composition is disclosed comprising forming a ketimine by reacting a primary amine with an acetoacetarylide, reacting through a coupling reaction an acetoacetarylide with an excess of a tetrazonium salt of 3,3'-dichlorobenzidine, and subsequently further coupling the excess tetrazonium salt with the ketimine; or reacting through a coupling reaction an excess of tetrazonium salt of 3,3'-dichlorobenzidine, and the ketimine, and subsequently further coupling the excess tetrazonium salt with an acetoacetarylide; or reacting through a coupling reaction a tetrazonium salt of 3,3'-dichlorobenzidine, an acetoacetarylide, and the ketimine, substantially simultaneously; resulting in a diarylide yellow pigment composition comprising
(a) the tetrazonium salt of 3,3'-dichlorobenzidine coupled with the acetoacetarylide; and
(b) the tetrazonium salt of 3,3'-dichlorobenzidine coupled with the ketimine; and,
(c) the tetrazonium salt of 3,3'-dichlorobenzidine coupled with the ketimine and the acetoacetarylide,
said composition having easy dispersibility, improved color strength and essentially no free primary amine.

Another aspect of this invention is an improved printing ink containing the above-mentioned diarylide yellow pigment composition.

By utilizing the compositions and processess of this invention, diarylide yellow pigment compositions and inks containing these compositions having improved color strength transparency and resistance to degradation are produced.

The foregoing, and other features and advantages of the present invention will become more apparent from the following description.

BEST MODE FOR CARRYING OUT THE INVENTION 3,3'-dichlorobenzidine is a well known intermediate used to manufacture dyes and pigments. 3,3'-dichlorobenzidine is a gray to purple crystalline solid which is insoluble in water, but soluble in alcohol and ether. It has a melting point of approximately 165° C. 3,3'-dichlorobenzidine is a commercially available substance and is typically manufactured by reducing o-nitrochlorobenzene to the hydrazobenzene, followed by rearrangement to the benzidine. The 3,3'-dichlorobenzidine which can be used in the practice of this invention includes 3,3'-dichlorobenzidine dihydrochloride, manufactured by Upjohn Company, North Haven, Conn.

The acetoacetarylides useful in the practice of this invention include AAA, AAMX, AAOT, AAOA and acetoacet-2,5-dimethoxy-4-chloranilide. These substances are commercially available. A particularly preferred acetoacetarylide is acetoacetanilide. Acetoacetanilide is a commonly available intermediate used in the manufacture of organic pigments. It is a white crystalline solid having a melting point of about 85° C. This substance is slightly soluble in water, and is soluble in dilute sodium hydroxide, alcohol, ether, acids, chloroform or hot benzene. Acetoacetanilide has the following chemical structure:

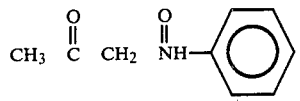

Acetoacetanilide is typically manufactured by reacting aniline with diketene. As previously mentioned, acetoacetanilide is commercially available and can be obtained from manufacturers, such as American Hoechst, Coventry, R.I.

The ketimines used in the practice of this invention are manufactured by reacting a primary amine with an acetoacetarylide. For example,

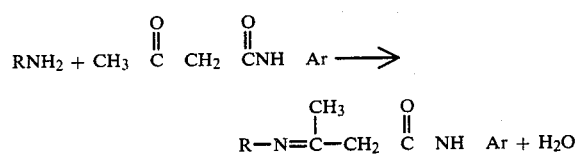

Usually a slight excess acetoacetarylide is used. This reaction can be carried out neat (as a melt) or in a solvent (such as toluene) until all the water of reaction is removed.

The amines which can be used in the practice of this invention are commercially available and are characterized by having a rather large alkyl, cycloalkyl or polycyclic group attached to the primary amine group. Examples of the amines which can be used in the practice of this invention to form the ketimines include Amine D ™ (dehydro abietyl amine), manufactured by Hercules Inc., Wilmington, Del.; Primene JM-T ™ ($C_{12-22}$ tertiary alkyl primary amine), manufactured by Rohm & Haas, Philadelphia, Pa.; Jetamine DT ™ (tallow diamine), manufactured by Jetco Chemicals, Inc., Corsicana, Tex.; and Jetco AE9 ™ (tallow tetramine), also manufactured by Jetco Chemicals, Inc.

The ketimines made by this reaction are usually used as dilute aqueous solutions in acetic acid (other acids like hydrochloric acid also can be used). The acetic acid used in the practice of this invention is commercially available technical grade having a strength of about 80 wt.%. An example of a commercially available acetic acid which can be used in the present invention is acetic acid manufactured by Brown Chemical Co. located in Oakland, N.J.

Diarylide yellow pigment compositions of this invention are incorporated as coloring agents in various types of printing inks including offset inks and publication gravure inks. The offset ink formulations are typical of those known in the art for heatset and quick-setting printing inks. The offset inks typically comprise rosin-modified synthetic resins, alkyds, phenolic resins, aliphatic ink oils, etc. The publication gravure inks are typical of those known in the art in that they comprise metal resinates, phenolic resins, clays, aliphatic and aromatic solvents, etc.

Diarylide yellow pigments are typically made by tetrazotizing 3,3'-dichlorobenzidine and coupling the resulting tetrazonium salt with acetoacetarylide. In order to make the pigments more easily dispersible, it has been the past practice to treat the pigment with an acidic solution of primary amine, raise the pH to precipitate the amine, then filter, wash, and form the ketimine by drying at elevated temperatures until the pigment reaches less than 1% by weight water.

In the practice of the process of the present invention, the initial step is the tetrazotization of the 3,3'-dichlorobenzidine. Sufficient quantities of 3,3'-dichlorobenzidine are charged into a conventional reactor vessel having a temperature control means and a mixing means. To the reactor vessel are then charged sufficient quantities of water, ice, hydrochloric acid and sodium nitrite to form 3,3'-dichlorobenzidine tetrazonium chloride. Preferably, for 253 parts (1.0 mole) of 3,3'-dichlorobenzidine, as its di-hydrochloride salt, are added about 1770 parts of water, about 380 parts (3.30 moles) of 31.5% hydrochloric acid, about 880 parts of ice and about 140 parts (2.03 moles) of sodium nitrite. The reaction is held for a sufficient period of time (typically about 45 minutes to 90 minutes, preferably about 60 minutes) as a sufficient temperature (typically about $-5°$ to $5°$ C., preferably about $0°$ C.) to assure complete formation of the tetrazonium salt. Any excess nitrous acid is destroyed by adding about 3 parts (0.03 mole) of sulfamic acid.

The ketimines of this invention may be added to the acetoacetarylide or 3,3'-dichlorobenzidine tetrazo salt prior to coupling, during coupling or after coupling to the coupling product. Coupling product is defined as the disazo reaction product of a tetrazo salt and an acetoacetarylide. Sufficient amounts of ketimine are added so that the finished pigment composition is easily dispersible and the ketimine moiety is completely reacted with the 3,3'-dichlorobenzidine tetrazonium salt. Typically about one-half mole percent to about 30 mole percent of ketimine is reacted per mole of 3,3'-dichlorobenzidine, more typically about one mole percent to about 10 mole percent, and preferably about 5 mole percent.

The ketimines of this invention are formed by reacting sufficient amounts of amines with sufficient amounts of acetoacetarylide to form the ketimine. Typically, for each mole of primary amine, about 1.0 to about 1.3 moles, more typically about 1.05 to about 1.20 moles, and preferably about 1.10 moles of acetoacetarylide are used.

The reaction may be carried neat (as a melt) or in a solvent; if a water-immiscible solvent, such as toluene, is used, the water of reaction may be separated in a Dean-Stark trap and measured periodically to follow the extent of reaction.

The reaction conditions are typically about 100° C. to about 140° C., more typically about 110° C. to about 120° C., and preferably about 110° C., for about one to three hours.

Sufficient amounts of the tetrazonium salt are charged to a reactor vessel containing an acetoacetarylide slurry for complete reaction with the acetoacetarylide (i.e., coupling). The slurry is typically made by mixing sufficient amounts of the acetoacetarylide with sufficient amounts of water, sodium acetate and acetic acid. The coupling reaction takes place for a sufficient amount of time (typically about 30–90 minutes, preferably 60 minutes) and at a sufficient temperature (typically about 15° to 20° C., preferably about 20° C.) to assure complete coupling of the tetrazonium salt.

Preferably for a conventional AAA diarylide yellow, for each mole of tetrazonium salt, the following amounts of components are used to form the acetoacetarylide slurry: about 358 parts (2.02 moles) of acetoacetarylide, about 380 parts (4.6 moles) of sodium acetate, about 101 parts (1.35 moles) of 80% acetic acid and 7300 parts water.

The diarylide yellow pigment compositions of this invention will comprise a mixture of a conventional diarylide yellow pigment (i.e., tetrazotized 3,3'-dichlorobenzidine coupled with acetoacetarylide) and a diketimine (i.e., tetrazotized 3,3'-dichlorobenzidine coupled with ketimine) and a monoketimine (i.e., tetrazotized 3,3'-dichlorobenzidine coupled with a ketimine and an acetoacetarylide). The ketimine is coupled with the tetrazotized 3,3'-dichlorobenzidine in the following ways of combination thereof. The first method is to couple the ketimine with an excess of tetrazotized 3,3'-dichlorobenzidine and subsequently couple the excess with an acetoacetarylide. Another method is to couple an excess of 3,3'-dichlorobenzidine with an acetoacetarylide and subsequently couple the excess with ketimine. Yet another method is to substantially simultaneously couple 3,3'-dichlorobenzidine, acetoacetarylide and the ketimine. The reaction conditions are similar to those previously mentioned for coupling reactions. The amount of excess 3,3'-dichlorobenzidine used is the amount required to couple out the ketimine.

The improved diarylide yellow pigment compositions of this invention are filtered and washed to give presscakes; the presscakes may be flushed into flushed bases or dried, as is conventional in the art.

The printing inks of this invention are manufactured according to conventional methods known in the art. The diarylide pigment compositions of this invention are typically blended into these ink compositions by shot-milling, three-roll milling or high-speed dispersing, etc., or any other conventional process.

The following examples are illustrative of the principles and practice of this invention although not limited thereto. Parts and percentages are parts and percentages by weight.

EXAMPLE 1

A diarylide yellow pigment composition was prepared by charging 100 parts of 3,3'-dichlorobenzidine, as its di-hydrochloride salt, 700 parts of water, 150 parts of 31.5% hydrochloric acid, and 55.5 parts of sodium nitrite into a conventional reactor vessel. The reactant charge was stirred for about 60 minutes at a temperature of about 0°-5° C. until the 3,3'-dichlorobenzidine was completely reacted to form 3,3'-dichlorobenzidine tetrazonium chloride. The excess nitrous acid was then destroyed with about one part of sulfomic acid.

Several ketimines were formed by reacting acetoacetanilide with various primary amines (See Table).

TABLE

| Amine Used in 5 mole % Ketimine | Percent Amine in Pigment Composition | Pigment Content In Pigment Composition | Percent Strength Standard | Percent Strength, Corrected For Pigment Content |
|---|---|---|---|---|
| Tris(hydroxy methyl) amino methane (1) | 1.9 | 98 | 110 | 112 |
| 3-(Dimethylamino) propylamine (2) | 1.7 | 98 | 105 | 107 |
| 3-(Dibutylamino) propylamine (2) | 2.9 | 97 | 120 | 124 |
| 2-exo-Norbornyl amine (3) | 1.7 | 98 | 110 | 112 |
| 1-Adamantyl- amine (3) | 2.4 | 98 | 130 | 133 |
| Amine D TM (4) | 4.7 | 95 | 115 | 121 |
| Primene 81-R TM (5) | 3.3 | 97 | 90 | 93 |
| Primene JM-T TM (5) | 4.7 | 95 | 115 | 121 |
| Armeen T TM (6) | 4.6 | 95 | 85 | 89 |
| Duomeen C TM (6) | 4.6 | 95 | 90 | 95 |
| Jetamine DT TM (7) | 5.6 | 94 | 104 | 111 |
| TomahPA-17 TM (8) | 4.1 | 96 | 90 | 94 |
| Tomah DA-17 TM (8) | 5.2 | 95 | 92 | 97 |
| Jetco AE-15 TM (7) | 6.6 | 93 | 98 | 98 |
| Jetco AE-9 (7) | 7.5 | 92 | 100 | 109 |

(1) Angus Chemical Co.
(2) Union Carbide Co.
(3) Aldrich Chemical Co.
(4) Hercules Inc.
(5) Rohm & Haas Co.
(6) Akzo Chemical Co.
(7) Jetco Chemical Co.
(8) Exxon Chemical Americas The ketimines were formed by reacting one mole of amine with a ten mole percent excess of acetoacetanilide in a conventional reactor vessel at a temperature of about 110° C. to about 120° C. for about two to three hours, during which the water of reaction was removed. Sufficient ketimine, equal to 5 mole percent of the total acetoacetanilide, was stirred with half its weight of 80% acetic acid, then diluted with about 10 times its weight of water and stirred to make the ketimine solution. The ketimine solution was added to another reactor vessel, previously charged with the other 94.5 mole percent (122.8 parts) of acetoacetanilide, 2900 parts water, 150 parts sodium acetate and 4 parts 80% acetic acid. The 3,3'-dichlorobenzidine tetrazo solution was added to the ketimine solution acetoacetanilide slurry at 20° C. over a one-hour period; the reaction was maintained at a temperature of about 20° C. for another 60 minutes until the 3,3'-dichlorobenzidine tetrazo was completely coupled out. The resulting diarylide yellow slurries were filtered and washed, and the resulting press cakes were dried at room temperature. The dried pigments were then evaluated in Hoover mulled linseed oil versus a conventional AAA diarylide yellow made under similar conditions. The results of the testing presented in the Table show that the diarylide yellow pigments produced with the ketimines of 1-adamantylamine, 3-(dibutylamino)propylamine, Amine D TM, Primene JM-T TM, 2-exo-norbornylamine, tris-(hydroxymethyl)amino methane, Jetamine DT TM and Jetco AE-9 TM showed significant increases in strength and transparency; the diarylide yellow pigments produced from the other ketimines were not as effective. It should be noted that some of the primary amines used, such as 1-adamantyl amine and Primene JM-T TM, are too volatile to be used in the conventional way.

EXAMPLE 2

The three AAA diarylide yellow pigments in Example 1 made with the ketimines of 3-(dibutylamino)propyl amine, Amine D TM (dehydroabietylamine) and Primene JM-T TM ($C_{18-22}$ tertiary alkyl amine) were repeated, but scaled up by a factor of four. The percent strengths, corrected for pigment contents, were 108%, 116% and 110%, respectively.

EXAMPLE 3

The AAA diarylide yellow pigment made with the ketimine of Amine D was repeated as in Example 1, except that the ketimine solution was added at different points: before (as in Example 1), during and after coupling the acetoacetanilide. For adding the ketimine solution during coupling, the solution may be added concurrently with the 3,3'-dichlorobenzidine tetrazo solution or the ketimine solution may be added to the 3,3'-dichlorobenzidine tetrazo solution and the combined solutions added to the acetoacetanilide. For adding the ketimine solution after coupling the acetoacetanilide, the solution may be added alone or in a 1:1 molar ratio with acetoacetanilide. The strengths of the pigments made by adding the ketimine solution before or during coupling were approximately equal, whereas that from adding the ketimine solution after coupling was lower, however, the latter product was more opaque, an advantage in some publication gravure inks.

EXAMPLE 4

Flushed bases are manufactured by flushing the pigments of Example 3 into a rosin-modified resin/aliphatic ink oil vehicles such as Betalite TM I-640 (manufactured by Reichold Chemical Co.) Magie 535 (manufactured by Magie Bros. Oil Co.). The flushed bases contain about 30 wt.% pigment.

Heatset offset printing inks are manufactured by mixing
30 parts of one of the flushed bases,
55 parts of gelled rosin-modified phenolic resin/hydrocarbon resin/alkyd vehicle such as Lawter LoCal HG-1 TM brand manufactured by Lawter International Co., Northbrook, Ill.,
3 parts bodied linseed oil,
1 part polyethylene wax,
10.5 parts aliphatic ink oil (Magie 470 TM, manufactured by Magie Bros. Oil Co.).

The ingredients are mixed with a slow speed mixer. Rollouts of the resulting printing inks are made with a conventional proofer on coated paper stock. The printing inks show improved color strength and transparency when compared with a printing ink which is made with conventional AAA pigment.

The diarylide yellow pigment compositions of this invention exhibit superior strength and transparency when incorporated into conventional printing inks. The diarylide yellow pigments of the prior art were typically treated with primary amine after coupling and the amine then precipitated on the AAA diarylide pigment; the ketimine was formed when the pigment press cake was dried at elevated temperatures to a water content of less than about 1%. (The heat treating is known to degrade diarylide yellow pigments). This resulted in a pigment composition having some free, unreacted amine which would produce a printing ink having free amine. In the case of publication gravure inks, this can cause degradation of the printing ink vehicle. In the case of offset inks, this can cause excessive emulsification of the acidic fountain solution in the ink, resulting in adverse printing characteristics such as tinting and scumming. By introducing the amine into the diarylide yellow pigment composition in the form of a preformed ketimine rather than free primary amine, the disadvantages of the prior art are eliminated. The diarylide yellow pigment compositions contain essentially no free (i.e., unreacted) primary amines. By "essentially no free primary amines" is meant less than one percent free primary amine. It has not been previously possible to achieve dispersible diarylide yellow pigment compositions which did not contain unreacted free primary amine.

Although this invention has been shown and described with respect to detailed embodiments thereof, it will be understood by those skilled in the art that various changes in form and detail thereof may be made without departing from the spirit and scope of the claimed invention.

What is claimed is:

1. A diarylide yellow pigment composition manufactured by the method comprising forming a ketimine by reacting a pimary amine with an acetoacetarylide, reacting through a coupling reaction an acetoacetarylide with an excess of a tetrazonium salt of 3,3'-dichlorobenzidine, and subsequently further coupling the excess tetrazonium salt with the ketimine; or reacting through a coupling reaction an excess of a tetrazonium salt of 3,3'-dichlorobenzidine, and the ketimine, and subsequently further coupling the excess tetrazonium salt with an acetoacetarylide; or reacting through a coupling reaction a tetrazonium salt of 3,3'-dichlorobenzidine, an acetoacetarylide, and the ketimine, substantially simultaneously; resulting in a diarylide yellow pigment composition comprising
    (a) the tetrazonium salt of 3,3'-dichlorobenzidine coupled with the acetoacetarylide; and
    (b) the tetrazonium salt of 3,3'-dichlorobenzidine coupled with the ketimine; and,
    (c) the tetrazonium salt of 3,3'-dichlorobenzidine coupled with the ketimine and the acetoacetarylide,
said composition having easy dispersibility, improved color strength and essentially no free primary amine.

2. The diarylide yellow pigment composition of claim 1 wherein the acetoacetarylide is selected from the group consisting of acetoacetanilide, acetoacet-2,4,-xylidide, acetoacet-o-anisidide, acetoacet-o-toluidide, and acetoacet-2,5-dimethoxy-4-chloranilide.

3. The diarylide yellow pigment composition of claim 1 wherein the acetoacetarylide reacted with the primary amine is acetoacetanilide.

4. The diarylide yellow pigment composition of claim 3 wherein the primary amine is selected from the group consisting of aliphatic amines, cycloaliphatic amines and polycyclic amines.

5. The diarylide yellow pigment composition of claim 4, wherein the primary amine is selected from the group consisting of $C_{18-22}$ tertiary alkyl amine, 1-adamantylamine and dehydroabietylamine.

6. A method of manufacturing a diarylide yellow pigment composition comprising initially forming a ketimine by reacting a primary amine with an acetoacetarylide, then reacting through a coupling reaction an acetotacetarylide with an excess of a tetrazonium salt of 3,3'-dichlorobenzidine, and subsequently further coupling the excess tetrazonium salt with the ketimine; or reacting through a coupling reaction and excess of a tetrazomium salt of 3,3'-dichlorobenzidine, and the ketimine, and subsequently further coupling the excess tetrazonium salt with an acetoacetarylide; or reacting through a coupling reaction a tetrazonium salt of 3,3'-dichlorobenzidine, an acetoacetarylide, and the ketimine, substantially simultaneously thereby resulting in a diarylide yellow pigment composition comprising:
    (a) the tetrazonium salt of 3,3'-dichlorobenzidine, coupled with the acetoacetarylide; and
    (b) the tetrazonium salt of 3,3'-dichlorobenzidine coupled with the ketimine; and,
    (c) the tetrazonium salt of 3,3'-dichlorobenzidine coupled with the ketimine and the acetoacetarylide,
said composition having easy dispersibility, improved color strength and essentially no free primary amine.

7. The method of claim 6 wherein the acetoacetarylide is selected from the group consisting of acetoacetanilide, acetoacet-2,4-xylidide, acetoacet-o-toluidide, acetoacet-o-anisidide and acetoacet-2,5-dimethoxy-4-chloranilide.

8. The method of claim 6 wherein the primary amine is selected from the group consisting of aliphatic amines, cycloaliphatic amines and polycyclic amines.

9. The method of claim 8 wherein the primary amine is selected from the group consisting of $C_{18-22}$ tertiary aklyl amines, 1-adamantyl amine and dehydroabietly amine.

10. A printing ink consisting essentially of a vehicle and a diarylide yellow pigment composition wherein the improvement comprises a diarylide yellow pigment comprising the pigment of claims 1, 2, 3, 4 or 5.

* * * * *